June 7, 1938.  P. E. STONE  2,119,654
REAR VIEW MIRROR
Filed Feb. 20, 1936
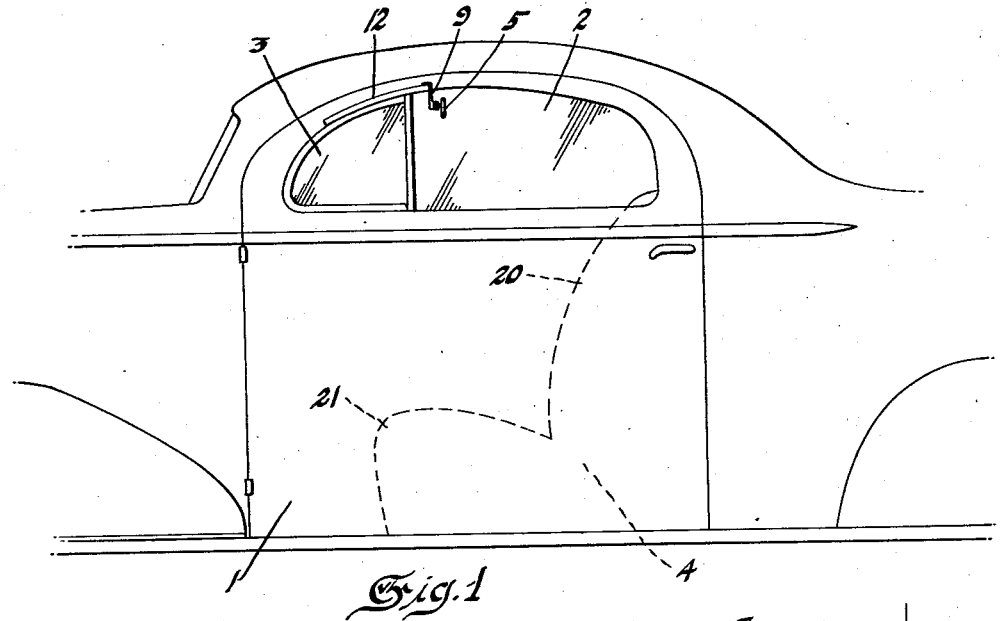
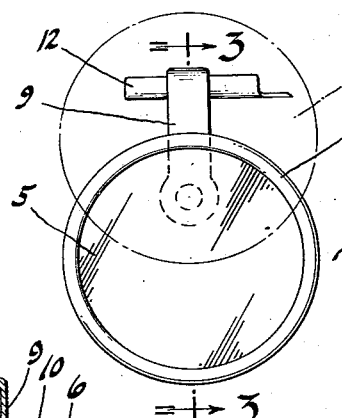
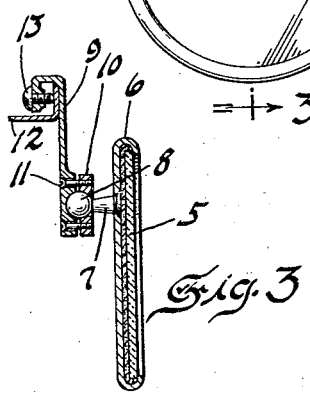
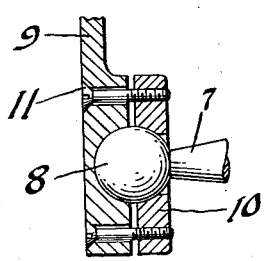
INVENTOR.
Porter E. Stone
BY Barnes, Kisselle, Laughlin & Raisch
ATTORNEY.

Patented June 7, 1938

2,119,654

UNITED STATES PATENT OFFICE 2,119,654

REAR VIEW MIRROR

Porter E. Stone, Detroit, Mich.

Application February 20, 1936, Serial No. 64,819

1 Claim. (Cl. 88—93)

This invention relates to a rear view mirror and more particularly to a mirror which is adapted for use on the outside of an automotive vehicle. A rear view mirror on the outside of an automotive vehicle is not broadly new. However, it has heretofore been customary to mount the outside rear view mirror on the windshield pillar or the door hinge at the forward vertical edge of the door, which positioned the mirror an appreciable distance ahead of the observer which in most cases is the driver. Due to this considerable distance between the eyes of the driver and the mirror it has been necessary to make the mirror relatively large, for example, most of these outside rear view mirrors have been circular and about six inches in diameter. A mirror six inches in diameter causes an appreciable blind spot for the driver and also sets up appreciable wind noises, especially at high speeds.

Among the objects of this invention may be mentioned the following: to produce a rear view mirror which will give an unobstructed view of the traffic in back of the vehicle and yet provide an unobstructed view for the driver of the traffic in front of the driver, thus making the operation of the vehicle more safe; to produce an outside rear view mirror which has an especially large range of vision for a relatively small size compared to the outside rear view mirrors now in use; to produce an outside rear view mirror in which the reflection of head lights or sunlight is diffused thereby cutting down the glare to which the driver is subjected; to produce a rear view outside mirror that will permit a change of position of the driver or passenger and which will permit passengers of different size to use the same mirror in the same position without any adjustment of the mirror being necessary; to produce an outside rear view mirror that will not be affected by vibration of the vehicle and therefore will give a clear image at all times; to produce an outside rear view mirror that will practically eliminate wind noises due to the small size of the mirror and the proximity to the body to which it is mounted; to produce a mirror that is relatively inconspicuous due to its small size.

In the drawing:

Fig. 1 shows a side elevation of an automotive vehicle body with an outside rear view mirror.

Fig. 2 is a detail of the mirror assembly.

Fig. 3 is a section along the line 3—3 of Fig. 2.

Fig. 4 is a detail of the ball and socket connection between the mirror and its supporting bracket.

Fig. 5 shows a modified form of mounting the mirror on the body.

Referring more particularly to the drawing there is shown an automotive vehicle having a front door 1 and a window opening closed by a sliding panel 2 and a swinging panel 3, which is commonly known as a no draft window. The automotive vehicle which is shown is a coupe. Therefore, it has one full-width seat 4 which may be denoted as the driver's seat. It is, of course, appreciated that this mirror is primarily intended for the driver's use, although it can be used for passengers both in the front seat as well as those in the rear seat. However, whether used with a front seat or a rear seat, the mirror necessarily must be mounted within a predetermined range of the observer to obtain the objects of the invention set forth above.

As herein shown the rear view mirror comprises a convex glass 5 which preferably is a portion of the surface of a true sphere with the convex side addressed to or facing the driver or observer of the mirror. However, the mirror, if desired, can have a cylindrical or otherwise curved surface, the point being that the mirror should be so formed that a greater range of reflection will be had, that is, provide a greater range of vision for the observer or driver than a flat mirror of the same size without unduly distorting the reflected image.

The mirror 5 is fixed in a case 6 having a stud 7 terminating in a ball 8. The ball 8 engages in a spherical socket provided in the bracket 9 and plate 10. The plate 10 is secured to the bracket 9 by the screws 11 which may be turned down to vary the frictional engagement in the ball and socket joint.

The mirror 5 preferably is mounted on the outside of the body at the side of the driver. Thus the mirror 5 can be mounted between the front face 20 of the seat back and the front face 21 of the seat bottom and about even with the front 21 of the seat, the mirror will give a good rear view. However, the mirror can be positioned anywhere on the outside of the body from a position just forward of the driver's eyes to a position approximately even with the front vertical edge or front end of the window. In any case this zone within which the mirror is mounted will also fall between the front and rear vertical edges of the window opening.

As herein shown the mirror 5 is mounted by hooking the bracket 9 over the trough 12 above the ventilating window and slightly to the rear of the rear edge of the ventilating window to permit it to swing out and by securing the bracket 9 to the trough 12 by a turned down screw 13.

It will be noted that the ball stud 7 is mounted eccentrically on the mirror. This, in conjunction with the ball and socket joint between the mirror and the bracket 9, permits the mirror to be adjusted very readily and in innumerable positions including the position wherein the edge of the mirror abuts the window glass. However, due to the convexity of the mirror and the fact that it is positioned so close to the eyes of the driver, after once being properly positioned the driver can shift his position or another driver of a different size can occupy the driver's seat without necessitating any further adjusting of the mirror.

The preferred overall diameter of the mirror 5 and mounting frame 6 is about two inches. This diameter can be increased or decreased somewhat without impairing the utility of the mirror and yet achieve the objects of the invention above enumerated. A mirror only two inches in diameter gives the observer or driver a range of vision and a clarity of image equal, if not better, than that provided with a flat mirror six inches in diameter mounted on the windshield pillar or front door hinge, which is a considerable distance forward of the eyes of the driver.

The mirror need not necessarily be mounted on the door or on the trough. There are numerous places in which the mirror might be mounted and yet fall within the range of position in proximity to the eyes of the driver as above described. Another of these mounting positions is shown in Fig. 5. As herein shown the mirror 5 is supported upon a bracket 14 connected to the mirror case 6 by a ball and socket joint the same as that above described. The bracket 14 projects upwardly in the channel provided for the sliding window 2 between the reveal 15 and the garnish molding 16. In other words, the bracket 14 is riveted or otherwise secured to what may be designated as the door header 17.

It will be noted, particularly in Fig. 5, that the mirror 5 can be mounted so that it is in contact with or within an inch or two of the outside face of the window glass. This mounting of the mirror 5 immediately adjacent the outside window or outside of the vehicle body appreciably cuts down the air noises. One of the theories advanced in explanation of this result is that air immediately adjacent, that is, within one or two inches of the outside of the body, is practically quiet, that is, the body builds its own streamline formation. Therefore, by mounting the mirror within this quiet air zone, no noise creating air eddies are set up by the mirror.

It will be noted, as shown in Fig. 5, that the mirror lies almost entirely within the outer edge 23 of the window opening. Since the mirror 5 is mounted in the window opening almost entirely within the outer edge of the vehicle body, this prevents the mirror from setting up any material or annoying wind noises.

I claim:

In combination with an automobile having a vehicle body with a window opening, a glass for closing the window opening inset from the outer edge of the vehicle body and a seat positioned within the body alongside the window opening, a rear view mirror, bracket means attached to the vehicle body at the upper horizontal edge of the window opening and attached to said mirror for positioning the mirror on the outside of the glass in a predetermined area below the top edge and above the bottom edge of the window opening and between the approximate vertical planes of the front face of the seat bottom and the front face of the seat back, the said bracket means being adapted for positioning the mirror with at least a portion of the mirror in the inset between the window glass and the outer edge of the body whereby the rear view mirror is positioned to one side and slightly forward but close to the eyes of the person occupying the said seat and therefore does not obstruct the front view of the said person and gives a rear view equal in scope to that of a larger mirror positioned forwardly of the above described area.

PORTER E. STONE.